(12) United States Patent
Boyd (10) Patent No.: US 11,452,287 B2
(45) Date of Patent: Sep. 27, 2022

(54) HOUSEFLY DETERRENT DEVICE

(71) Applicant: Bill E. Boyd, Tuscaloosa, AL (US)

(72) Inventor: Bill E. Boyd, Tuscaloosa, AL (US)

( * ) Notice: Subject to any disclaimer, the term of this patent is extended or adjusted under 35 U.S.C. 154(b) by 698 days.

(21) Appl. No.: 16/388,818

(22) Filed: Apr. 18, 2019

(65) Prior Publication Data

US 2019/0320645 A1 Oct. 24, 2019

Related U.S. Application Data

(60) Provisional application No. 62/659,557, filed on Apr. 18, 2018.

(51) Int. Cl.
*A01M 29/06* (2011.01)
*F16M 13/02* (2006.01)
*F16B 47/00* (2006.01)

(52) U.S. Cl.
CPC ............. *A01M 29/06* (2013.01); *F16B 47/00* (2013.01); *F16M 13/022* (2013.01)

(58) Field of Classification Search
CPC .................. A01M 29/06; A01M 29/00; A01M 2200/012; A01M 1/00; F16B 47/00; F16M 13/022
USPC .................................................. 119/712, 6.5
See application file for complete search history.

(56) References Cited

U.S. PATENT DOCUMENTS

| 2002/0116864 | A1* | 8/2002 | Pace ...................... | A01M 29/12 43/107 |
| 2003/0145793 | A1* | 8/2003 | Mathews ............... | A01M 29/08 119/6.5 |
| 2007/0044371 | A1* | 3/2007 | Meier ................... | A01M 1/106 43/107 |
| 2009/0031612 | A1* | 2/2009 | Hubbard ............... | A01M 29/08 43/132.1 |
| 2014/0153121 | A1* | 6/2014 | Savage ................. | A01M 29/08 359/850 |
| 2019/0183294 | A1* | 6/2019 | Olsen ...................... | A47K 5/12 |

\* cited by examiner

*Primary Examiner* — Muhammad Ijaz (57) ABSTRACT

A housefly deterrent device is an apparatus used to deter houseflies from approaching a particular area. The apparatus is also configured to mount to an appropriate area for ease of positioning and maintenance and does not rely on chemical compounds to affect houseflies. The apparatus includes a visual deterrent, an orienting fixture, and an attachment mechanism. The visual deterrent is a structure which mimics the physical appearance of the housing of various predators of houseflies sufficiently to affect the general behavior of houseflies. The orienting fixture is a mount which supports and arranges the visual deterrent in position, preferably adjacent to a door or a building entrance. The attachment mechanism is an arrangement of components that allows for connection of the orienting fixture to surfaces or relevant structures proximal to a target housefly protection zone. The visual deterrent is removable, facilitating adjustment, and general maintenance.

13 Claims, 6 Drawing Sheets

HOUSEFLY DETERRENT DEVICE

The current application claims a priority to the U.S. Provisional Patent application Ser. No. 62/659,557 filed on Apr. 18, 2018.

FIELD OF THE INVENTION

The present invention generally relates to a pest control device. More specifically, the housefly deterrent device repels houseflies by replicating the habitat of various housefly predators, particularly those of hornets and spiders.

BACKGROUND OF THE INVENTION

Bugs and insects are far more populous than humans. As such, bugs often exist in locations that are not preferable to humans. Residential properties, restaurants, animal barns, and more are examples of locations in which pests are generally unwelcome. Houseflies in particular have a way of entering properties where they are not wanted. Houseflies are bothersome to humans because not only are they difficult to catch, they are also attracted to food, making houseflies especially annoying during meals. Simultaneously, houseflies are repelled by their predators. Their many eyes create an overall distorted view of the world, which makes it difficult for houseflies to distinguish between hornet nests or spider webs and other items of similar appearance.

However, there is a dearth of inventions that address the problem of abundant houseflies by leveraging this property. Most inventions meant to address this issue are bug repellants. Such devices typically utilize a moderate to large amount of pesticide or other chemical compositions to repel flies and other bugs. Many of these are not only limited in their effectiveness, but also often have harmful environmental effects, such as being water insoluble, thereby becoming a runoff contaminant or an atmospheric pollutant. Many sprays and repellants also include a rather unpleasant smell. What is needed is a device which deters houseflies from entering a location without utilizing harmful or unpleasant chemicals. Particularly useful is a device which can be mounted to the entrances of residences or other locations and removed easily for cleaning and general maintenance.

The present invention addresses these issues. The housefly deterrent device mounts to walls or surfaces adjacent to a target area, such as the entrance to a house. The mount of the present invention is removable, which improves the ability of the user to clean and maintain the mount and facilitates the mounting process. The mount is used to hang an apparatus that visually deters houseflies from approaching. The visual deterrent is shaped roughly like a hornet's nest. Filling the visual deterrent with water or other similar fluid makes the base of the visual deterrent shimmer refract light similar to a spider's web. This ensures that a housefly is interested in avoiding the visual deterrent, as the visual deterrent looks like the housing of both spiders and hornets, both of which are predators to the housefly.

DETAILED DESCRIPTION OF THE INVENTION

All illustrations of the drawings are for the purpose of describing selected versions of the present invention and are not intended to limit the scope of the present invention.

Figure 1:
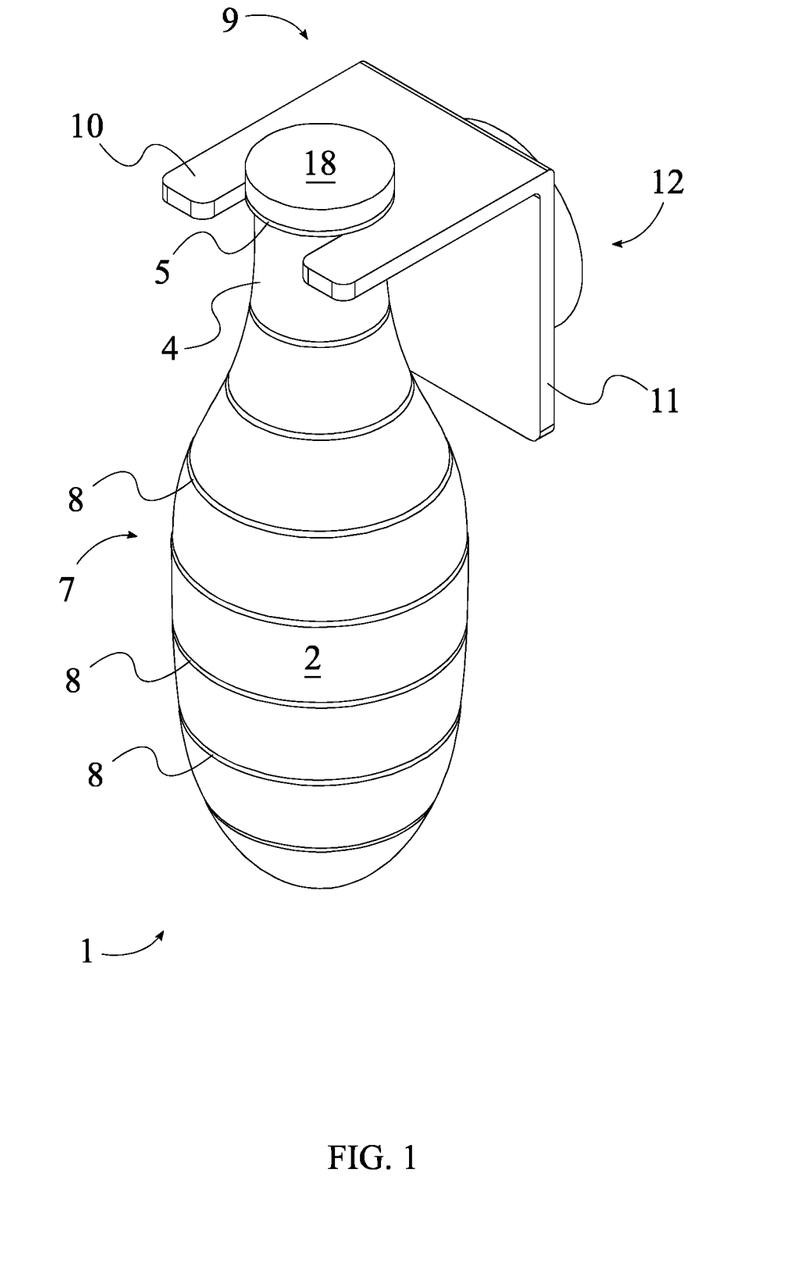
FIG. 1 is a front-right perspective view of the present invention.

The present invention is a housefly deterrent device that is used to deter houseflies from approaching a particular area. The present invention is also configured to mount to an appropriate area for ease of positioning and maintenance and does not rely on chemical compounds to affect houseflies. The present invention comprises a visual deterrent 1, an orienting fixture 9, and an attachment mechanism 12, as seen in FIG. 1. The visual deterrent 1 is a structure which mimics the physical appearance of the housing of various predators of houseflies sufficiently to affect the general behavior of houseflies. The orienting fixture 9 is a mount which supports and arranges the visual deterrent 1 in position, preferably adjacent to a door or a building entrance. The attachment mechanism 12 is an arrangement of components that allows for connection of the orienting fixture 9 to surfaces or relevant structures proximal to a target housefly protection zone.

The general configuration of the aforementioned components allows the present invention to efficiently and effectively deter houseflies from approaching a target area. The visual deterrent 1 comprises a transparent receptacle 2, a quantity of clear liquid 6, and a plurality of deterrent features 7. The transparent receptacle 2 is a container that is optically clear, allowing for houseflies to observe and be subsequently affected by the contents of the transparent receptacle 2. The quantity of clear liquid 6 is a volume of liquid that refracts light to roughly mimic the textural appearance of a spiderweb when observed by a housefly. The plurality of deterrent features 7 is a set of protrusions and/or indents of various shapes that suggest the appearance of a hornet's nest. In an exemplary embodiment, the plurality of deterrent features 7 may also resemble strands or patterned shapes commonly created by spiderwebs. Together, the transparent receptacle 2, the quantity of clear liquid 6, and the plurality of deterrent features 7 combine to generate the appearance of a hostile environment for houseflies, thereby affecting the behavior of houseflies. Furthermore, other bugs and insects that are prey to hornets and spiders may be similarly deterred from approaching the present invention. The plurality of deterrent features 7 is laterally integrated into the transparent receptacle 2, as seen in FIG. 1. This arrangement allows the plurality of deterrent features 7 to be positioned clearly within view of a housefly or insect. Further, the plurality of deterrent features 7 is distributed along the transparent receptacle 2. The positioning of the plurality of deterrent features 7 allows for arrangement in patterns that resemble those of hornet nests. The quantity of clear liquid 6 is retained within the transparent receptacle 2. Containing the quantity of clear liquid 6 positions the quantity of clear liquid 6 adjacent to the plurality of deterrent features 7, thus ensuring that the quantity of clear liquid 6 is visible by houseflies. The transparent receptacle 2 is mounted offset from the attachment mechanism 12 by the orienting fixture 9. This arrangement allows the user to choose the position and orientation of the transparent receptacle 2 relative to a doorframe or other structure.

Figure 3:
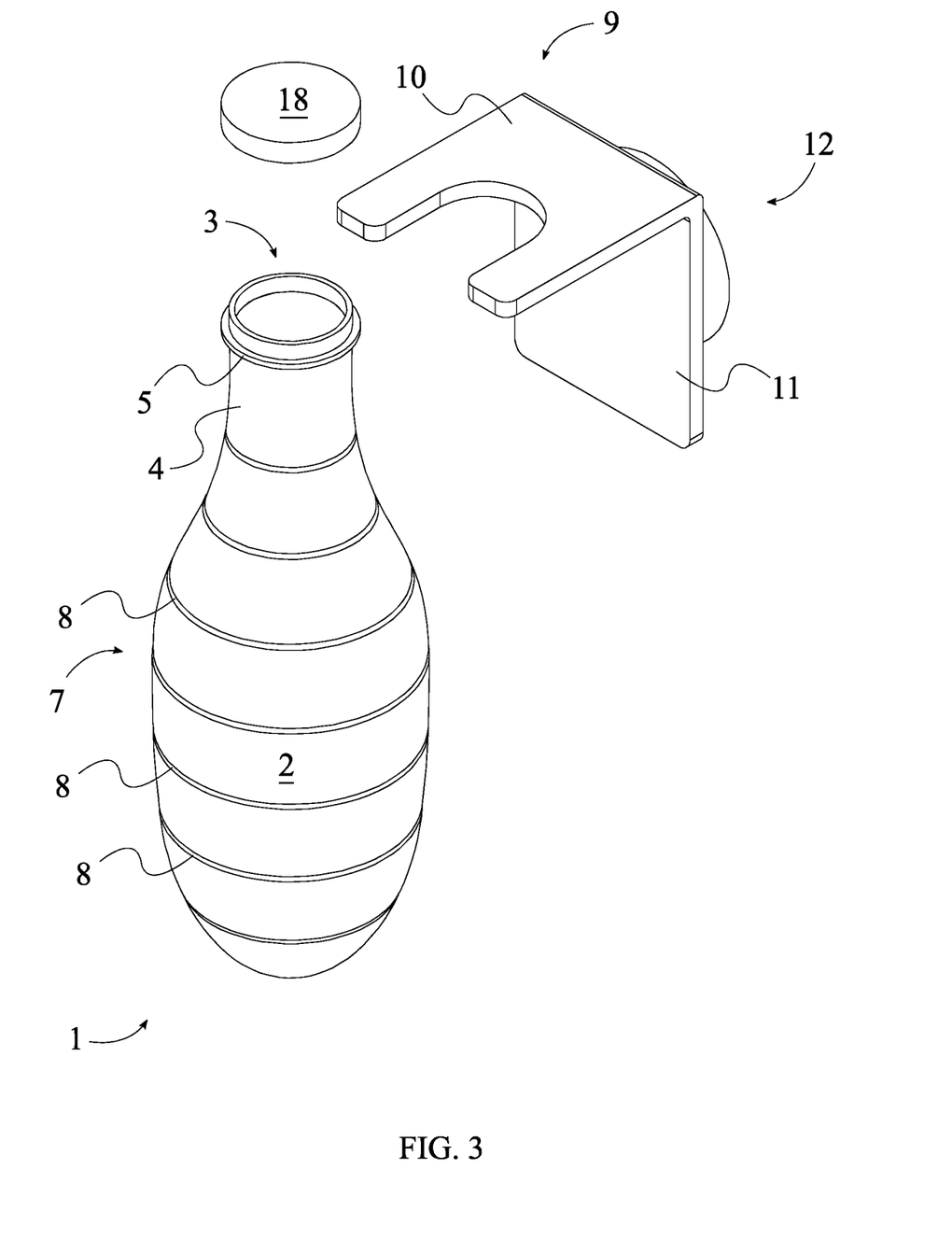
FIG. 3 is a front-right exploded view of the present invention.

The quantity of clear liquid 6 may tend to evaporate or be affected by bugs which are not influenced by the visual deterrent 1. In some cases, bugs may even crawl into the transparent receptacle 2 and lay eggs or create waste, thus increasing the opacity of the quantity of clear liquid 6. To this end, the present invention comprises a liquid cap 18, as seen in FIG. 3. The liquid cap 18 is a device which prevents entry of pests or bugs into the transparent receptacle 2, and further prevents reduction of the quantity of clear liquid 6 by evaporation. The transparent receptacle 2 comprises a receptacle mouth 3. The receptacle mouth 3 is the primary opening of the transparent receptacle 2 through which liquids may be added or removed for maintenance or calibration purposes. The liquid cap 18 is hermetically attached across the receptacle mouth 3. This arrangement prevents the quantity of clear liquid 6 from exiting the transparent receptacle 2 or from collecting filth from various contaminants.

Figure 5:
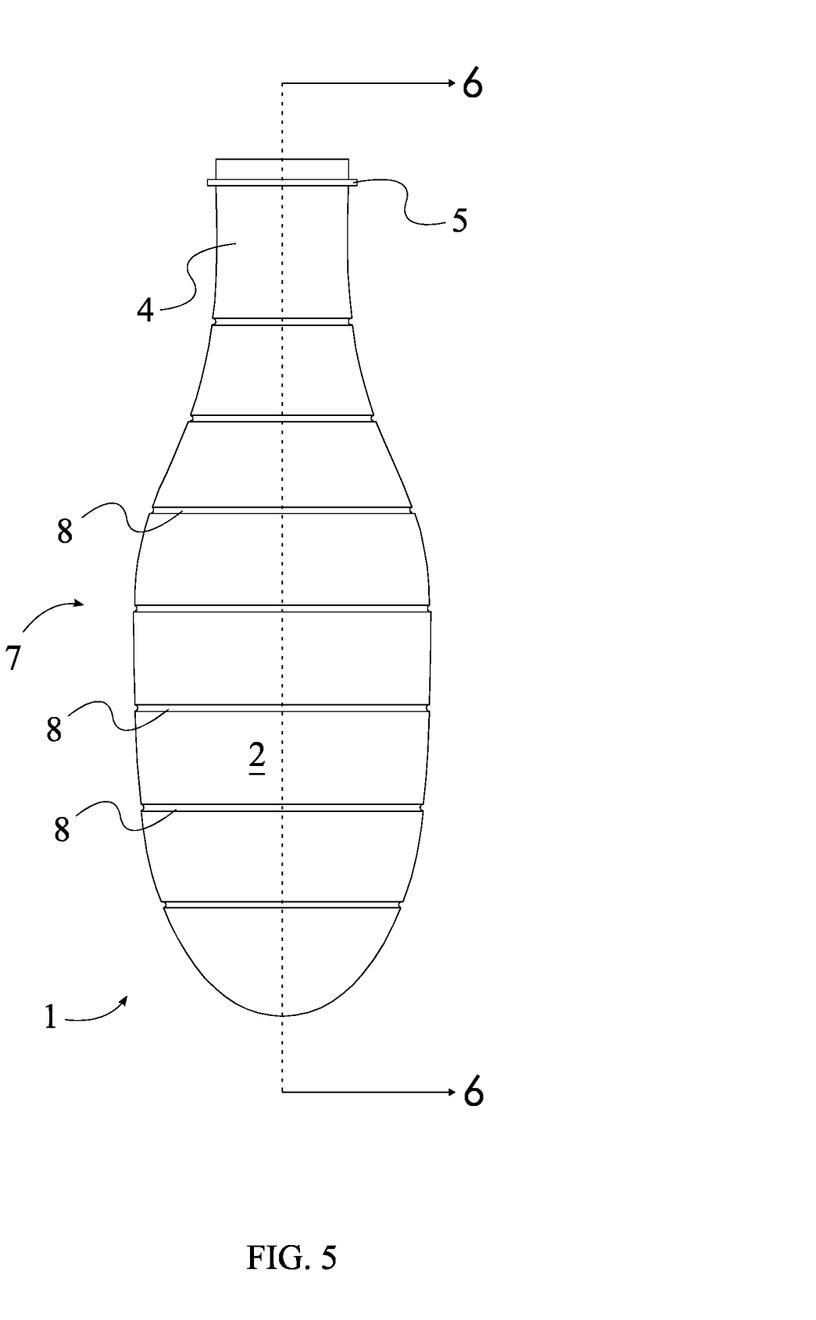
FIG. 5 is a front view of the visual deterrent of the present invention.

The present invention relies upon the optical properties of the visual deterrent 1 in order to be optimally effective; therefore, it is advantageous to include a mechanism by which to position the visual deterrent 1 relative to the sun or another light source. In order to allow for such positional manipulation, the transparent receptacle 2 comprises a receptacle neck 4 and a neck rim 5, as seen in FIG. 5. The receptacle neck 4 is a section of the transparent receptacle 2 preferably proximal to an upper portion of the transparent receptacle 2 that tapers. The neck rim 5 is a ridge which allows for engagement with the orienting fixture 9. The orienting fixture 9 comprises a U-shaped panel 10 and a bracing panel 11. The U-shaped panel 10 is a curved mount which joins with the neck rim 5 to appropriately arrange the transparent receptacle 2. The bracing panel 11 is a generally flat, rigid segment of the orienting fixture 9 that joins to the attachment mechanism 12. The neck rim 5 is laterally connected around the receptacle neck 4. Furthermore, the neck rim 5 is removably engaged onto the U-shaped panel 10. By connecting in this way, the neck rim 5 allows for the receptacle neck 4 to control the orientation of the transparent receptacle 2 relative to the orienting fixture 9. This connection allows the user to remove the transparent receptacle 2 from a mounted position on the U-shaped panel 10, thus improving the ability of the user to adjust the quantity of clear liquid 6. The bracing panel 11 is perpendicularly connected to the U-shaped panel 10. Consequently, the bracing panel 11 is positioned offset from the transparent receptacle 2 when the transparent receptacle 2 is mounted to the U-shaped panel 10. Further, the attachment mechanism 12 is mounted onto the bracing panel 11. In this arrangement, the transparent receptacle 2 is offset from the attachment mechanism 12, thereby preventing interference of the attachment mechanism 12 with the transparent receptacle 2 during orientation of the transparent receptacle 2.

Figure 2:
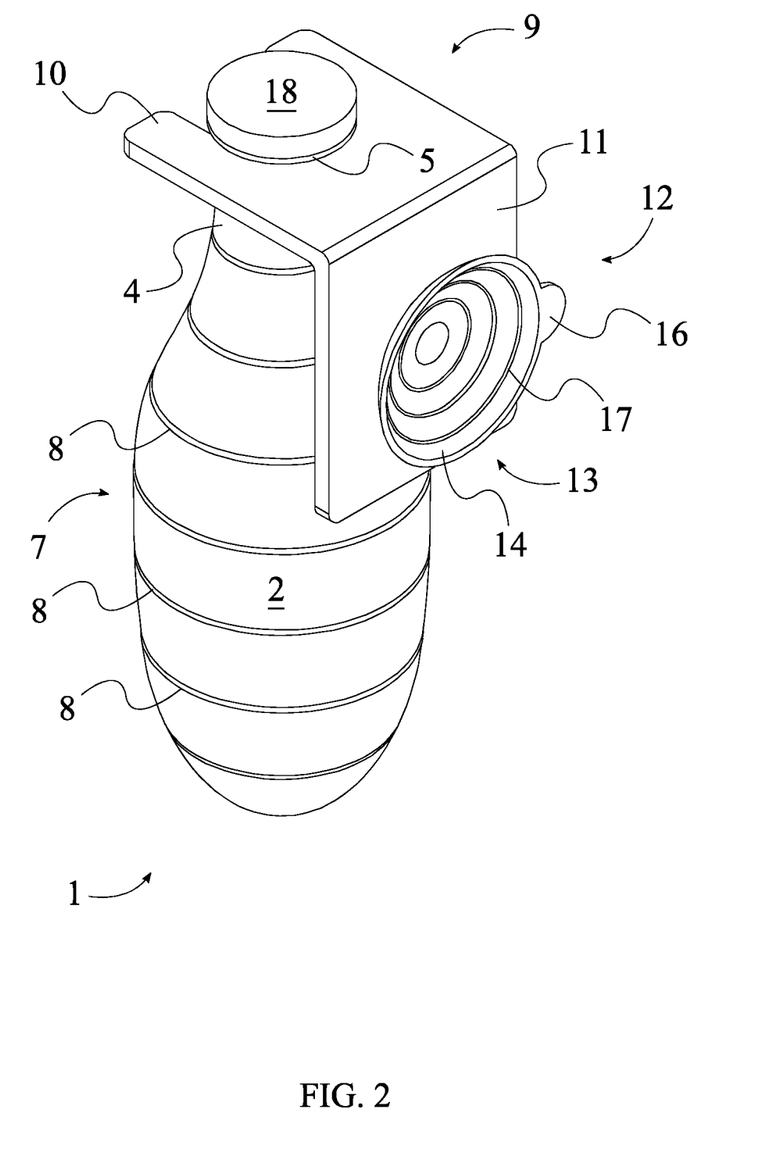
FIG. 2 is a back-right perspective view of the present invention.
Figure 4:
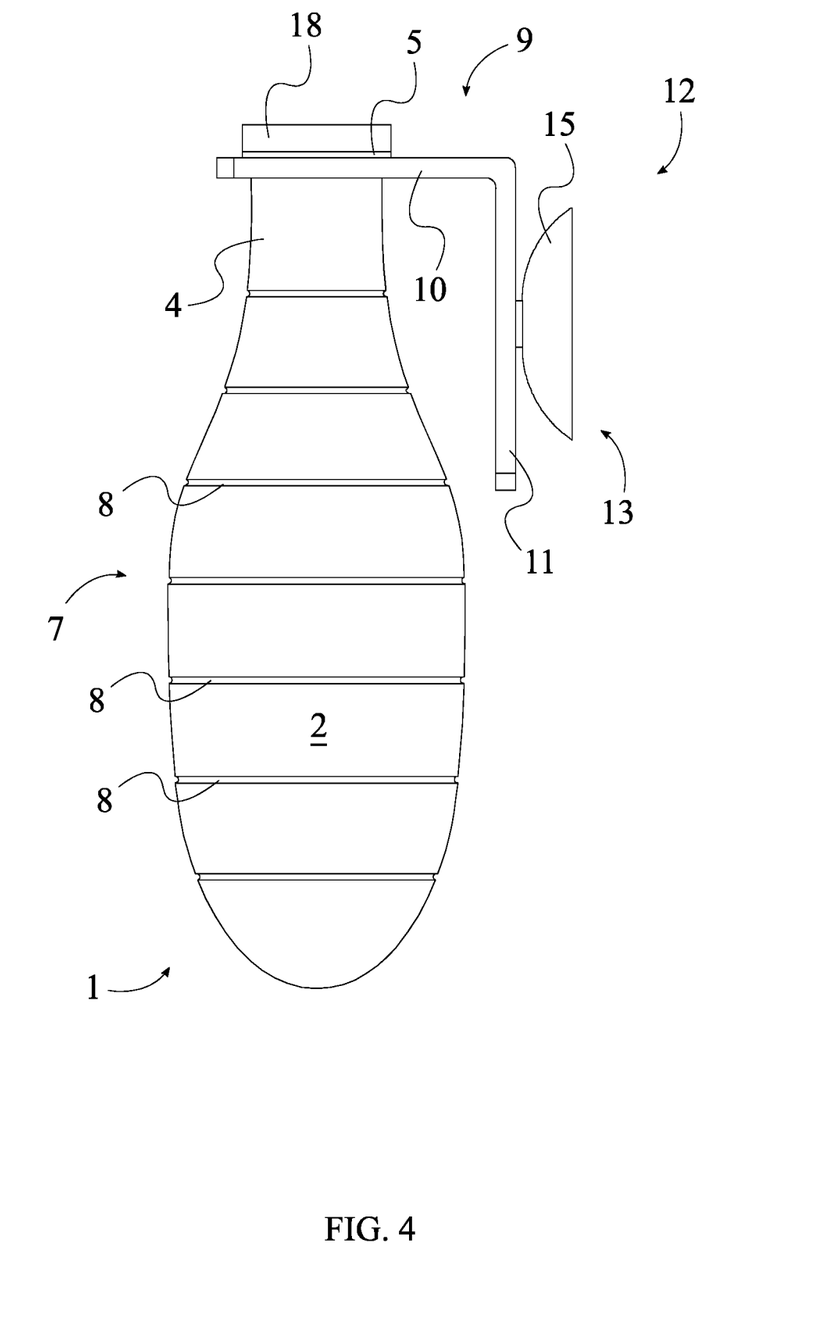
FIG. 4 is a right view of the present invention.

The attachment mechanism 12 must allow the user to adjust the location of the visual deterrent 1 as needed. To accomplish this, the attachment mechanism 12 comprises a suction cup 13, a removal tab 16, and a plurality of annular ridges 17, as seen in FIG. 2. The suction cup 13 is a semirigid polymeric cone which creates a hermetic seal against a surface when depressed into that surface. The removal tab 16 is a protrusion that enables the user to conveniently break the hermetic seal to detach the suction cup 13 from the related surface. The plurality of annular ridges 17 is a series of generally circular protrusions that enhance the ability of the user to create a hermetic seal with the suction cup 13. The suction cup 13 comprises a concave surface 14 and a convex surface 15. The concave surface 14 is the surface which flattens against a surface to hermetically attach the suction cup 13 to the surface. The convex surface 15 is the surface opposite the concave surface 14 which is compressed to activate the suction cup 13, as seen in FIG. 4. The orienting fixture 9 is mounted onto the convex surface 15. This arrangement positions the orienting fixture 9 adjacent to the suction cup 13. The plurality of annular ridges 17 is encircled amongst each other. By concentrically ordering the plurality of annular ridges 17, the hermetic seal becomes more difficult to unintentionally break. The plurality of annular ridges 17 is connected onto the concave surface 14. Thusly, the plurality of annular ridges 17 contacts the surface to which the suction cup 13 is mounted, thus increasing the contacting surface area and therefore improving the connection between the concave surface 14 and the mounting surface. Finally, the removal tab 16 is peripherally connected to the suction cup 13. Such an arrangement allows the user to easily remove the suction cup 13 for maintenance, cleaning, or repositioning. While the attachment mechanism 12 has been explained in relation to a suction cup 13, other embodiments exist, including the use of removable adhesives, temporary fasteners, various mounts, and more which similarly enable addition, adjustment, and convenient removal of the attachment mechanism 12 to a target surface.

Figure 6:
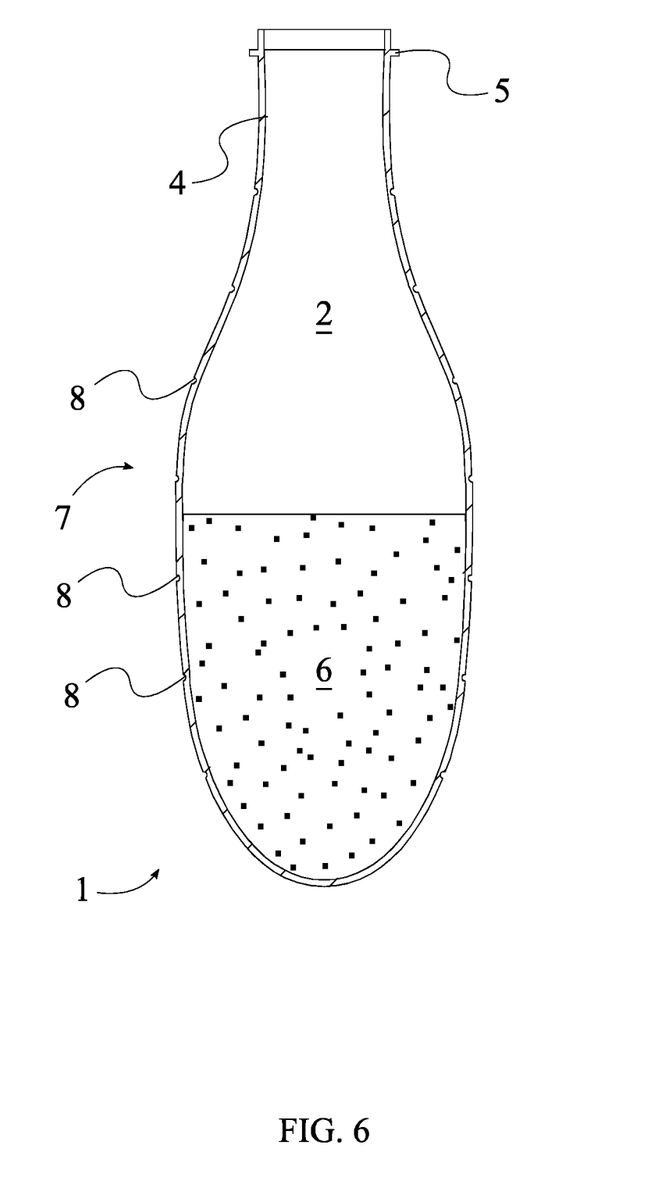
FIG. 6 is a cross-sectional view about line 5-5 in FIG. 5 of the visual deterrent of the present invention.

Among the advantages of the present invention is the absence of harmful or odorous chemicals. In an exemplary embodiment, the quantity of clear liquid 6, as seen in FIG. 6, is a quantity of water. This arrangement ensures no damage due to toxicity, ease of disposal and replacement, and absence of any unpleasant odors. Alternatively, other liquids may be used which accomplish optical transparency, thereby resembling the characteristics of spiderwebs most easily noticed by houseflies.

Most common hornet nests include several distinctive features, especially annular ridges, which a housefly will typically avoid if possible. To this end, in an exemplary embodiment, the plurality of deterrent features 7 is a plurality of channels 8, as seen in FIG. 5. In this arrangement, the visual deterrent 1 is made to closely resemble the appearance of a hornet's nest. The plurality of channels 8 is a set of annular cuts around the transparent receptacle 2 strategically spaced to resemble a hornet's nest. Such an arrangement improves the ability of the present invention to repel houseflies.

In the preferred usage of the present invention, the user acquires a housefly deterrent device. The user connects the orienting fixture 9 to the attachment mechanism 12. The attachment mechanism 12 is subsequently connected to a wall or other surface, often in proximity to the entrance of a residence or other indoor space. The quantity of clear liquid 6 is placed within the transparent receptacle 2, partially or completely filling the transparent receptacle 2. The transparent receptacle 2 is then joined, hung, or otherwise mounted to the orienting fixture 9. The orienting fixture 9 is rotated, pivoted, or otherwise adjusted to ensure optimal positioning of the transparent receptacle 2 relative to an adjacent light source. Thus, the transparent receptacle 2 is positioned both for effectiveness relative to a housefly-protected area as well as for ease of removal for cleaning, readjustment, or other maintenance.

Although the invention has been explained in relation to its preferred embodiment, it is to be understood that many other possible modifications and variations can be made without departing from the spirit and scope of the invention as hereinafter claimed.

What is claimed is:
1. A housefly deterrent device comprises:
a visual deterrent;
an orienting fixture;
an attachment mechanism;
the visual deterrent comprises a transparent receptacle, a quantity of clear liquid, and a plurality of deterrent features;
the transparent receptacle comprises a receptacle neck and a neck rim;
the orienting fixture comprises a U-shaped panel and a bracing panel;
the plurality of deterrent features being laterally integrated into the transparent receptacle;
the plurality of deterrent features being distributed along the transparent receptacle;
the quantity of clear liquid being retained within the transparent receptacle; and
the transparent receptacle being mounted offset from the attachment mechanism by the orienting fixture;
the neck rim being laterally connected around the receptacle neck;
the neck rim being removably engaged onto the U-shaped panel;
the bracing panel being perpendicularly connected to the U-shaped panel; and
the attachment mechanism being mounted onto the bracing panel.

2. The housefly deterrent device as claimed in claim 1 comprises:
a liquid cap;
the transparent receptacle comprises a receptacle mouth; and
the liquid cap being hermetically attached across the receptacle mouth.

3. The housefly deterrent device as claimed in claim 1 comprises:
the attachment mechanism comprises a suction cup, a removal tab, and a plurality of annular ridges;
the suction cup comprises a concave surface and a convex surface;
the orienting fixture being mounted onto the convex surface;
the plurality of annular ridges being encircled amongst each other;
the plurality of annular ridges being connected onto the concave surface; and
the removal tab being peripherally connected to the suction cup.

4. The housefly deterrent device as claimed in claim 1, wherein the quantity of clear liquid is a quantity of water.

5. The housefly deterrent device as claimed in claim 1, wherein the plurality of deterrent features is a plurality of channels.

6. A housefly deterrent device comprises:
a visual deterrent;
an orienting fixture;
an attachment mechanism;
the visual deterrent comprises a transparent receptacle, a quantity of clear liquid, and a plurality of deterrent features;
the transparent receptacle comprises a receptacle neck and a neck rim;
the orienting fixture comprises a U-shaped panel and a bracing panel;
the plurality of deterrent features being laterally integrated into the transparent receptacle;
the plurality of deterrent features being distributed along the transparent receptacle;
the quantity of clear liquid being retained within the transparent receptacle;
the transparent receptacle being mounted offset from the attachment mechanism by the orienting fixture;
the neck rim being laterally connected around the receptacle neck;
the neck rim being removably engaged onto the U-shaped panel;
the bracing panel being perpendicularly connected to the U-shaped panel;
the attachment mechanism being mounted onto the bracing panel; and
the plurality of deterrent features being a plurality of channels.

7. The housefly deterrent device as claimed in claim 6 comprises:
a liquid cap;
the transparent receptacle comprises a receptacle mouth; and
the liquid cap being hermetically attached across the receptacle mouth.

8. The housefly deterrent device as claimed in claim 6 comprises:
the attachment mechanism comprises a suction cup, a removal tab, and a plurality of annular ridges;
the suction cup comprises a concave surface and a convex surface;
the orienting fixture being mounted onto the convex surface;
the plurality of annular ridges being encircled amongst each other;
the plurality of annular ridges being connected onto the concave surface; and
the removal tab being peripherally connected to the suction cup.

9. The housefly deterrent device as claimed in claim 6, wherein the quantity of clear liquid is a quantity of water.

10. A housefly deterrent device comprises:
a visual deterrent;
an orienting fixture;
an attachment mechanism;
the visual deterrent comprises a transparent receptacle, a quantity of clear liquid, and a plurality of deterrent features;
the transparent receptacle comprises a receptacle neck and a neck rim;
the orienting fixture comprises a U-shaped panel and a bracing panel;
the attachment mechanism comprises a suction cup, a removal tab, and a plurality of annular ridges;
the suction cup comprises a concave surface and a convex surface;
the plurality of deterrent features being laterally integrated into the transparent receptacle;
the plurality of deterrent features being distributed along the transparent receptacle;
the quantity of clear liquid being retained within the transparent receptacle;
the transparent receptacle being mounted offset from the attachment mechanism by the orienting fixture;
the neck rim being laterally connected around the receptacle neck;
the neck rim being removably engaged onto the U-shaped panel;

the bracing panel being perpendicularly connected to the U-shaped panel;

the attachment mechanism being mounted onto the bracing panel;

the orienting fixture being mounted onto the convex surface;

the plurality of annular ridges being encircled amongst each other;

the plurality of annular ridges being connected onto the concave surface; and the removal tab being peripherally connected to the suction cup.

11. The housefly deterrent device as claimed in claim 10 comprises:

a liquid cap;

the transparent receptacle comprises a receptacle mouth; and the liquid cap being hermetically attached across the receptacle mouth.

12. The housefly deterrent device as claimed in claim 10, wherein the quantity of clear liquid is a quantity of water.

13. The housefly deterrent device as claimed in claim 10, wherein the plurality of deterrent features is a plurality of channels.

\* \* \* \* \*